(No Model.) 3 Sheets—Sheet 1.

E. G. LATTA.
VEHICLE WHEEL.

No. 479,946. Patented Aug. 2, 1892.

Witnesses:
Emil Neuhart
Fred. C. Geyer

E. G. Latta, Inventor.
By Wilhelm Bonner,
Attorneys.

(No Model.) 3 Sheets—Sheet 2.
E. G. LATTA.
VEHICLE WHEEL.
No. 479,946. Patented Aug. 2, 1892.
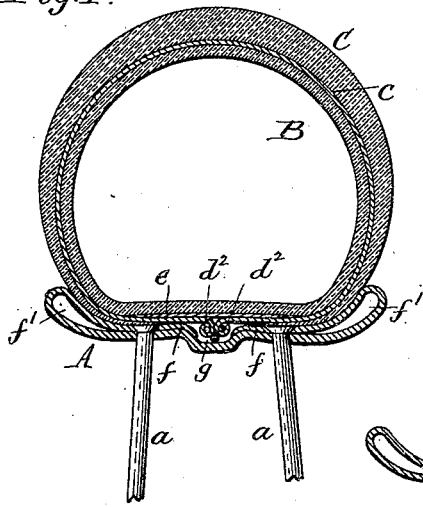
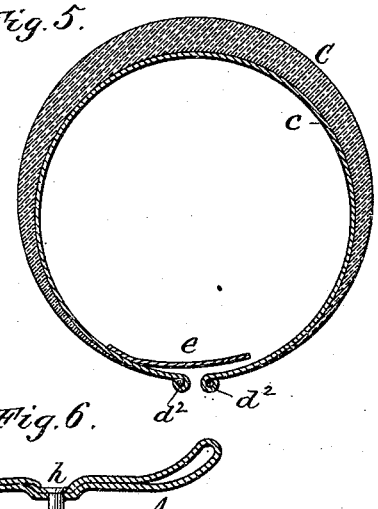
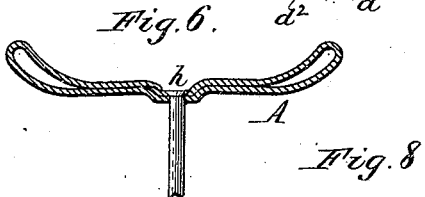
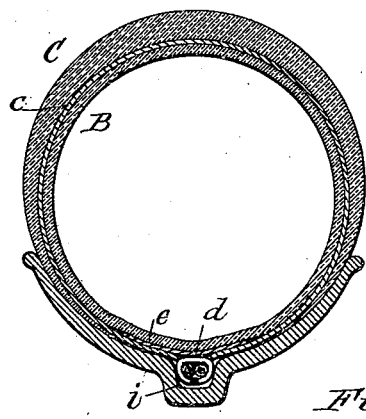
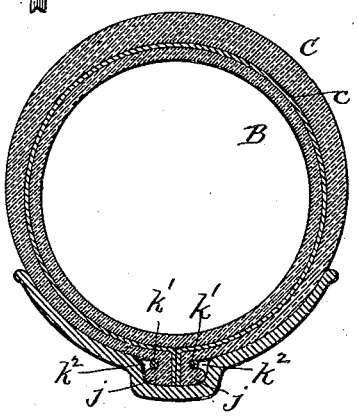
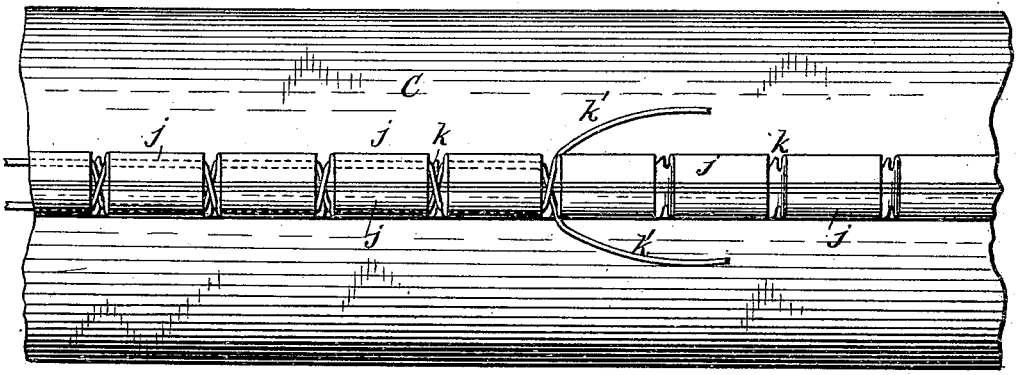
Witnesses:
Emil Neuhart
Fred. C. Geyer
E. G. Latta Inventor.
By Wilhelm Bonner
Attorneys.

(No Model.) 3 Sheets—Sheet 3.

E. G. LATTA.
VEHICLE WHEEL.

No. 479,946. Patented Aug. 2, 1892.

Witnesses:
Emil Neuhart
Fred C. Geyer

E. G. Latta  Inventor.
By Wilhelm Bonner
Attorneys.

UNITED STATES PATENT OFFICE.

EMMIT G. LATTA, OF FRIENDSHIP, NEW YORK.

VEHICLE-WHEEL.

SPECIFICATION forming part of Letters Patent No. 479,946, dated August 2, 1892.

Application filed January 21, 1892. Serial No. 418,802. (No model.)

*To all whom it may concern:*

Be it known that I, EMMIT G. LATTA, of Friendship, in the county of Allegany and State of New York, have invented new and useful Improvements in Vehicle-Wheels, of which the following is a specification.

This invention relates to vehicle-wheels having pneumatic tires, and more especially to velocipede-wheels of this character in which the tire is made removable, so that it can be easily repaired when necessary.

The objects of my invention are to produce a light and inexpensive tire of this class and to so construct the tire and the rim of the wheel that a maximum area of the tire is exposed outside of the rim and also to increase the strength and rigidity of the rim.

Figure 1:
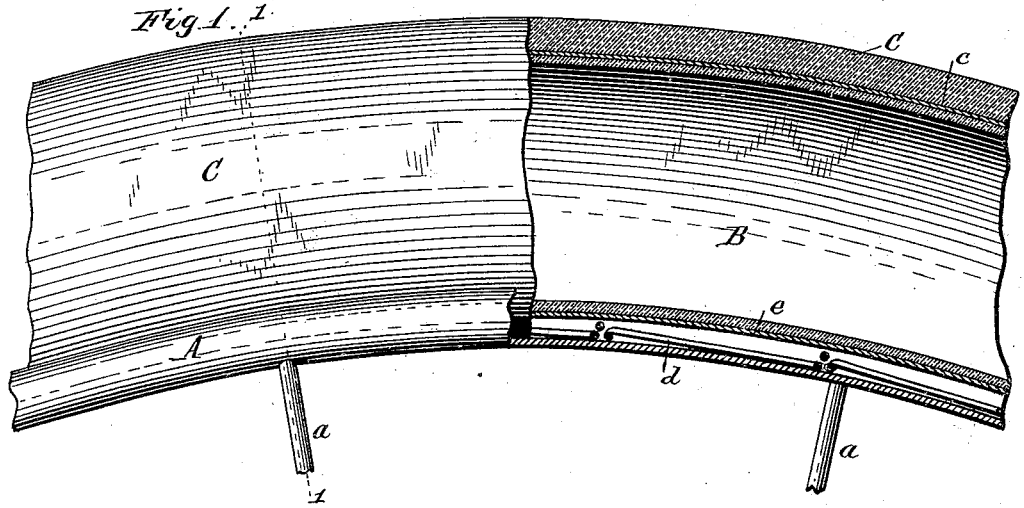
Figure 2:
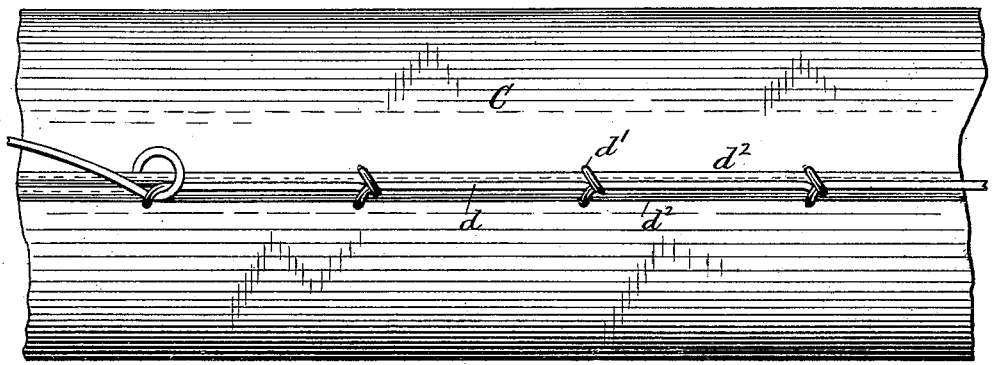
Figure 3:
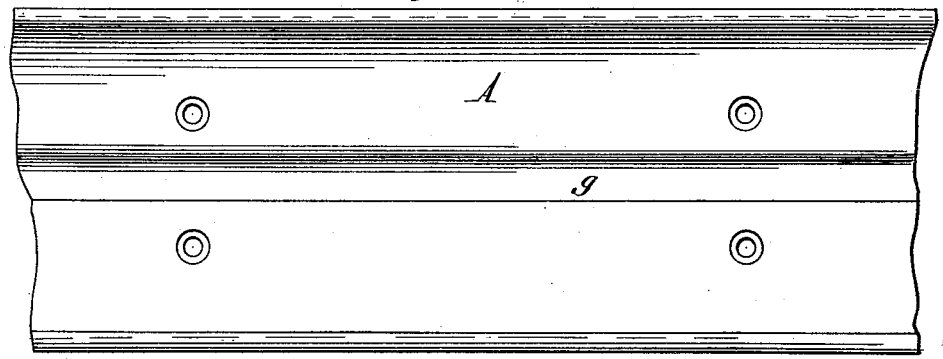
Figure 10:
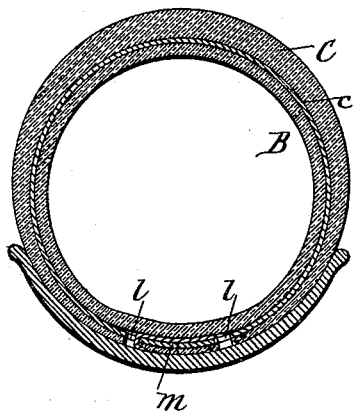
Figure 11:
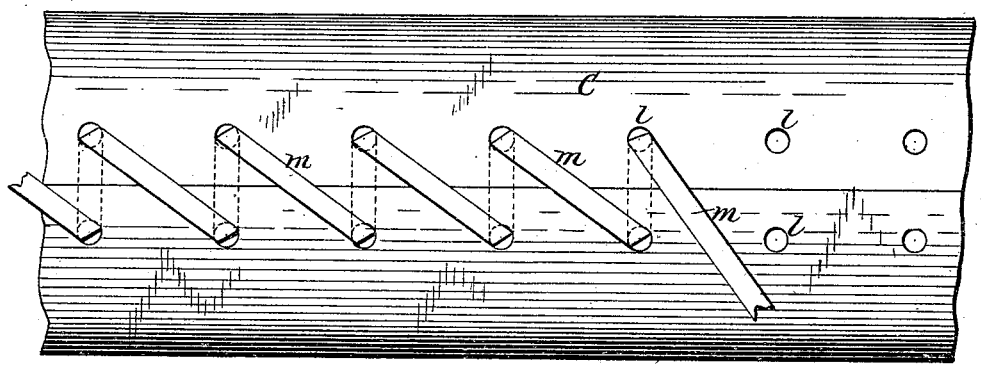

In the accompanying drawings, consisting of three sheets, Figure 1 is a fragmentary side elevation, partly in section, of a velocipede-wheel containing my improvements. Fig. 2 is a detached inner view of the tire. Fig. 3 is a fragmentary face view of the rim with the tire omitted. Fig. 4 is a cross-section in line 1 1, Fig. 1. Fig. 5 is a cross-section of the cover or envelope detached from the rim and with its edges separated. Fig. 6 is a cross-section of a modified form of the rim. Fig. 7 is a cross-section showing the tire illustrated in Figs. 1, 2, 4, and 5 in connection with a solid rim, the plane of section being through one of the knots of the lacing-cord. Fig. 8 is a cross-section of a modified form of the tire. Fig. 9 is a fragmentary inner view thereof. Fig. 10 is a cross-section of another modification of the tire applied to an ordinary solid rim. Fig. 11 is a fragmentary inner view of the same.

Like letters of reference refer to like parts in the several figures.

A represents the rim of the wheel, and $a$ the spokes secured thereto. The tire consists of the usual inner air chamber or tube B and a protecting covering or envelope C, constructed of any suitable material which is flexible but inelastic. Rubber having a lining of canvas $c$ may be employed for this purpose. The tread or outer portion of the envelope is made thicker than its side portions, which latter are tapered or reduced to the thickness of the canvas. The longitudinal edges of the envelope, which meet at the center of the rim, are turned outward and after placing the air-tube within the envelope are united by a lacing-cord $d$, which is passed through coinciding openings or recesses $d'$, formed in both meeting edges of the envelope. The edges of the envelope through which the lacing-cord passes are preferably strengthened by a cord $d^2$, interwoven therewith, or are otherwise reinforced to prevent the lacing-cord from tearing out. The lacing-cord after being passed through a set of holes in the envelope edges may be tied or looped at such holes and then extended along the envelope to the next set of holes and again tied, and so on throughout the length of the tire, as shown in Figs. 1 and 2. The ends of the lacing-cord may be fastened together upon completing the circuit of the tire, or, if desired, tight knots may be formed at every stitch or set of openings. A continuous lacing-cord may be employed, if desired; but the use of a number of short cords is more convenient. The joint formed by the meeting edges of the envelope is preferably covered by a flap $e$ of canvas or other suitable material, so as to protect the adjacent portion of the air-tube from wear. This flap is attached only to one of the envelope edges to permit the envelope to be readily opened when necessary. After uniting the edges of the envelope by the lacing-cord the tire is placed on the rim and inflated for use. A thin coat of cement is preferably applied to the face of the rim before seating the tire thereon, and after partly inflating the tire the cement is melted by heating the rim. This manner of securing the tire guards against the admission of water between the tire and the face of the rim, prevents creeping or longitudinal displacement of the tire on the rim, and permits the rim to be made shallower than if no cement were used.

In case the air-tube should leak from a rent the cement will permit the tire to be easily torn loose for a sufficient distance to afford access to the portion of the lacing-cord adjacent to the leak. The lacing-cord is then cut or untied, the envelope opened, and a patch cemented or otherwise applied over the rent. By the time the opened lacing-stitches are replaced the patch will usually have become sufficiently secure to permit the tire to be again inflated and used at once. The loosened portion of the tire can be again cemented to the rim at any convenient time by heating the adjacent portion of the rim to remelt the cement.

The rim is preferably constructed of sheet metal and has its lateral portions doubled or folded inwardly against the lower inner thickness of the rim, as shown at $f$, the edges of the inwardly-lapped portions being flattened against the middle portion of the rim and secured thereto by brazing, soldering, or any other means. The central part of the rim and its adjacent edges are depressed to form a groove $g$, which receives the longitudinal rib or ridge formed by the outwardly-turned meeting edges of the envelope and the lacing-cord, as most clearly shown in Fig. 4. By this construction of the rim the inner face of the envelope is rendered sufficiently smooth to guard against the liability of wearing the inclosed air-tube.

The doubled outer portions of the rim are not flattened against the inner thickness of the rim, but are simply rounded or bent, so as to leave a space $f'$ between such inner thickness and the inwardly-lapped portions, whereby the rim is stiffened and its edges are caused to present a large surface to the tire, thus preventing cutting of the tire at such edges.

The spokes $a$ are arranged in pairs and their heads are seated in countersunk holes formed in the doubled portions of the rim on opposite sides of its central groove. The inner thickness of the rim serves the purpose of the washers, employed in connection with ordinary hollow rims of a single thickness for preventing withdrawal of the spokes.

The modified construction of the rim shown in Fig. 6 is desirable in connection with a single row of spokes secured to the central portion of the rim. In this modification one of the doubled portions $h$ of the rim is extended across the grooved or depressed central portion of the rim to which the spokes are attached, so as to reinforce the same.

In the modification illustrated in Fig. 7 my improvements are shown as applied to a solid rim. In this construction the solid rim is formed with a central groove or depression $i$ for receiving the outwardly-turned meeting edges of the envelope.

In Figs. 8 and 9 is shown a construction which is designed more especially for hard service and in which the weight of the tire is less important. In this modification the edges of the envelope are each formed with a longitudinal rib $j$, the two ribs resting against each other and being provided with transverse notches or recesses $k$, forming a series of segregated lugs or projections around which the lacing-cord is drawn. In this construction, a double lacing-cord $k'$ is employed, the strands of which cross each other in the recesses between the pairs of lugs. These lugs are provided in their outer sides with grooves $k^2$, which receive the lacing-cord and confine it upon the lugs.

The modified constructions illustrated in Figs. 10 and 11 show my improvements adapted to an ordinary rim having no central groove. In this modification the edges of the envelope are not turned outwardly or reinforced by cords, but meet in a flush joint at the center of the rim and are provided with holes $l$ for receiving a flat lacing-cord $m$. This cord may be passed through the openings of the envelope edges in zigzag form, as shown in Fig. 11, or in any other desired manner. In this construction the rubber portion of the envelope is extended to the extreme edges of the envelope and made slightly heavier at the edges than in the construction shown in Figs. 1, 2, 4, 5, and 7 to give the edges sufficient strength to resist tearing out of the lacing-cord. The latter, being flat, projects but slightly beyond the inner surface of the tire, leaving the joint between the meeting edges of the envelope comparatively smooth. In this construction the flap $e$ may be omitted.

I claim as my invention—

1. The combination, with a wheel-rim having a concave or grooved face, of an inflatable tire consisting of an inner air-tube, a removable envelope inclosing the air-tube and having meeting edges located within the concave face of the wheel-rim, and a detachable lacing-cord connecting the meeting edges of the envelope and adapted to be removed from the openings in said meeting edges for obtaining access to the air-tube, the lacing-cord being arranged within the concave face of the rim and the tire being capable of removal from the rim without unlacing its envelope, substantially as set forth.

2. The combination, with the tire consisting of an air-tube and a surrounding envelope having its meeting edges separably connected, of a supporting-rim provided in its face with a circumferential groove or depression which receives the meeting edges of the envelopes, substantially as set forth.

3. A wheel-rim having a concave face and composed of a strip of sheet metal having its lateral portions doubled inwardly toward its concave face, the inner edges of such doubled portions being flattened against the central portion of the concave rim-face, rendering the center of the rim solid, while the outer edges of such doubled portions are rounded and separated from the inner thickness of the rim by an intervening space, substantially as set forth.

Witness my hand this 14th day of January, 1892.

EMMIT G. LATTA.

Witnesses:
F. H. RICE.
C. J. RICE.